US011385520B2

(12) United States Patent
Wei

(10) Patent No.: US 11,385,520 B2
(45) Date of Patent: Jul. 12, 2022

(54) DUAL-VIEW DISPLAY METHOD AND DEVICE, AND NON-TRANSITORY COMPUTER READABLE STORAGE MEDIUM

(71) Applicant: BOE Technology Group Co., Ltd., Beijing (CN)

(72) Inventor: Wei Wei, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 89 days.

(21) Appl. No.: 16/958,980

(22) PCT Filed: Jan. 11, 2019

(86) PCT No.: PCT/CN2019/071343
§ 371 (c)(1),
(2) Date: Jun. 29, 2020

(87) PCT Pub. No.: WO2019/205746
PCT Pub. Date: Oct. 31, 2019

(65) Prior Publication Data
US 2020/0333681 A1  Oct. 22, 2020

(30) Foreign Application Priority Data
Apr. 25, 2018 (CN) .......................... 201810379700.4

(51) Int. Cl.
*G02F 1/29* (2006.01)
*G06F 3/01* (2006.01)
*G09G 3/36* (2006.01)

(52) U.S. Cl.
CPC ................ *G02F 1/29* (2013.01); *G06F 3/013* (2013.01); *G09G 3/36* (2013.01);
(Continued)

(58) Field of Classification Search
CPC ............ G06F 3/013; G02F 1/29; G02F 1/335; G09G 2320/028; G09G 2320/068;
(Continued)

(56) References Cited

U.S. PATENT DOCUMENTS 3,758,195 A * 9/1973 Hedman, Jr .............. G02F 1/23
349/33
10,656,428 B2 * 5/2020 Wei ...................... G02B 27/126
(Continued)

FOREIGN PATENT DOCUMENTS

CN  102232200 A  11/2011
CN  103048835 A  4/2013
(Continued)

OTHER PUBLICATIONS

Xiao et al, Translation of CN205720912 Nov. 23, 2016 (Year: 2016).*
(Continued)

*Primary Examiner* — Dmitriy Bolotin
(74) *Attorney, Agent, or Firm* — Banner & Witcoff, Ltd.

(57) ABSTRACT

Provided by embodiments of the present disclosure are a dual-view display method and device, and a non-transitory computer readable storage medium. The dual-view display method is used for a dual-view display device including a display module and a liquid crystal grating, the method includes obtaining information of an observer, adjusting an operation mode of the liquid crystal grating according to the information of the observer, to adjust a light exiting direction and a display mode of the display device and displaying an image in the display mode according to the information of the observer, and the operation mode of the liquid crystal grating is adjustable.

18 Claims, 8 Drawing Sheets

(52) U.S. Cl.
CPC . *G09G 2320/028* (2013.01); *G09G 2320/068* (2013.01); *G09G 2320/08* (2013.01); *G09G 2354/00* (2013.01)

(58) Field of Classification Search
CPC .......... G09G 2320/08; G09G 2354/00; G09G 3/003; G09G 3/36; H04N 13/31; H04N 13/366; H04N 13/368
See application file for complete search history.

(56) References Cited

U.S. PATENT DOCUMENTS

| | | | |
|---|---|---|---|
| 10,819,973 B2 * | 10/2020 | French | H04N 13/344 |
| 10,823,977 B2 | 11/2020 | Wang et al. | |
| 2004/0012671 A1 * | 1/2004 | Jones | H04N 13/324 |
| | | | 348/51 |
| 2005/0111100 A1 * | 5/2005 | Mather | H04N 13/31 |
| | | | 359/464 |
| 2007/0058127 A1 * | 3/2007 | Mather | G02B 30/27 |
| | | | 349/159 |
| 2007/0146603 A1 * | 6/2007 | Uehara | G02F 1/134363 |
| | | | 349/141 |
| 2007/0164950 A1 * | 7/2007 | Tajiri | H04N 13/305 |
| | | | 345/87 |
| 2007/0183015 A1 * | 8/2007 | Jacobs | H04N 13/31 |
| | | | 359/245 |
| 2007/0273715 A1 * | 11/2007 | Sugiyama | G02B 30/30 |
| | | | 345/690 |
| 2008/0001849 A1 * | 1/2008 | Jin | G02F 1/13471 |
| | | | 345/4 |
| 2008/0198095 A1 * | 8/2008 | Kurumisawa | G09G 3/003 |
| | | | 345/1.1 |
| 2008/0303842 A1 * | 12/2008 | Okamoto | G06F 3/048 |
| | | | 345/629 |
| 2009/0243961 A1 * | 10/2009 | Momose | G02B 30/30 |
| | | | 345/1.3 |
| 2010/0302351 A1 * | 12/2010 | Yanamoto | H04N 13/315 |
| | | | 348/55 |
| 2012/0044330 A1 * | 2/2012 | Watanabe | H04N 13/315 |
| | | | 348/54 |
| 2012/0113510 A1 * | 5/2012 | Sato | H04N 13/312 |
| | | | 359/462 |
| 2012/0320170 A1 * | 12/2012 | Lee | G02F 1/1323 |
| | | | 348/54 |
| 2013/0050611 A1 * | 2/2013 | Parry-Jones | G02F 1/133526 |
| | | | 349/62 |
| 2013/0088653 A1 * | 4/2013 | Lee | H04N 13/376 |
| | | | 349/15 |
| 2014/0293172 A1 * | 10/2014 | Suzuki | G02B 30/27 |
| | | | 349/15 |
| 2016/0094838 A1 * | 3/2016 | Koito | H04N 13/31 |
| | | | 348/54 |
| 2016/0274373 A1 * | 9/2016 | Suzuki | G09G 3/003 |
| 2017/0108629 A1 * | 4/2017 | Lin | G02B 27/4205 |
| 2018/0199030 A1 * | 7/2018 | Smith | G02B 30/27 |
| 2019/0377177 A1 * | 12/2019 | Takahashi | G02B 27/0093 |
| 2020/0029067 A1 * | 1/2020 | Lee | G06K 9/00281 |

FOREIGN PATENT DOCUMENTS

| | | |
|---|---|---|
| CN | 103246076 A | 8/2013 |
| CN | 104185987 A | 12/2014 |
| CN | 104330916 A | 2/2015 |
| CN | 104618706 A | 5/2015 |
| CN | 105049832 A | 11/2015 |
| CN | 105629621 A | 6/2016 |
| CN | 205541690 U | 8/2016 |
| CN | 106094386 A | 11/2016 |
| CN | 205720912 U | 11/2016 |
| CN | 106292093 A | 1/2017 |
| CN | 106791797 A | 5/2017 |
| CN | 106954059 A | 7/2017 |
| CN | 107229131 A | 10/2017 |
| CN | 108540791 A | 9/2018 |
| WO | 2015045251 A1 | 4/2015 |

OTHER PUBLICATIONS

Apr. 25, 2019—(CN) First Office Action Appn 201810379700.4 with English Translation.

* cited by examiner

DUAL-VIEW DISPLAY METHOD AND DEVICE, AND NON-TRANSITORY COMPUTER READABLE STORAGE MEDIUM

This application is a U.S. National Phase Entry of International Application No. PCT/CN2019/071343 filed on Jan. 11, 2019, designating the United States of America and claiming priority to Chinese Patent Application No. 201810379700.4, filed Apr. 25, 2018. The present application claims priority to and the benefit of the above-identified applications and the above-identified applications are incorporated by reference herein in their entirety.

TECHNICAL FIELD

Embodiments of the present disclosure relate to a dual-view display method and device and a non-transitory computer readable storage medium.

BACKGROUND

A dual-view display technology is a technology in which two pictures are displayed on a single display panel at a same time, and observers located at different angles in front of the display panel may watch different pictures. A known dual-view display device is mainly implemented by providing a grating in the display panel. The grating is provided in front of a display light exiting unit, and includes light transmitting regions and light shielding regions alternately arranged; a display screen includes first sub-display regions and second sub-display regions alternately arranged; and the dual-view displaying is implemented by correspondingly setting widths and an arrangement of the light transmitting region and the light shielding region of the grating, as well as a position and an arrangement of the first sub-display region and the second sub-display region.

In the known dual-view display technology, a light exiting direction of the dual-view display device is fixed, depending on the widths and the arrangement of the light transmitting region and the light shielding region of the grating, and cannot be changed. An observer has to be located at a specific angle relative to a screen display plane so as to obtain a target picture effect. When an observation position of the observer is changed, a display effect will drop sharply, which causes great inconvenience in enjoying the video content. In addition, in order to avoid interference of two pictures in a dual-view mode, in a related dual-view technology, display light exiting directions in the dual-view mode are generally set to be separated at a large angle, which requires observers watching different display pictures to be far away from each other, thus affecting interaction among family members when watching the video at home or in other application scenarios.

SUMMARY

Embodiments of the present disclosure provide a dual-view display method and device, and a non-transitory computer readable storage medium, and the dual-view display method and device can combine tracking of eyes to adaptively change the light exiting direction of the dual-view with change of the observing angle of the observer.

The first aspect according to the embodiments of the present disclosure provides a dual-view display method, the dual-view display method is used for a dual-view display device comprising a display module and a liquid crystal grating, the method comprises: obtaining information of an observer; adjusting an operation mode of the liquid crystal grating according to the information of the observer, to adjust a light exiting direction and a display mode of the display device; and displaying an image in the display mode according to the information of the observer, wherein the operation mode of the liquid crystal grating is adjustable.

In some embodiments, the adjusting an operation mode of the liquid crystal grating according to the information of the observer to adjust a light exiting direction and a display mode of the display device includes: determining an observation mode according to the information of the observer; determining a control voltage of the liquid crystal grating according to the information of the observer and the observation mode, and the displaying an image in the display mode according to the information of the observer includes: displaying the image in the display mode according to the observation mode.

In some embodiments, the obtaining the information of the observer includes: obtaining a number and an observation position of the observer.

In some embodiments, the obtaining the number and the observation position of the observer includes: collecting image information within an observation region of the dual-view display device in real time; identifying the number of the observer according to the image information within the observation region; and identifying an eye position of the observer according to the image information within the observation region, and determining the eye position of the observer as the observation position of the observer, wherein the eye position is a symmetrical center of both eyes of the observer.

In some embodiments, the determining the observation mode according to the information of the observer includes: determining the observation mode as a single-view mode and determining the observer as an equivalent observer under a condition that the number of the observer is 1; determining observation angles of the observers under a condition that the number of the observer is 2 or more, and determining the observation mode as a dual-view mode or the single-view mode according to the observation angles.

In some embodiments, the determining the observation angles of the observers under a condition that the number of the observer is 2 or more includes: determining an intersection angle between a line connecting the observation position of the observer with a center of the display device and a display plane of the display device, and the determining the observation mode according to the observation angles includes: determining the observation mode as the dual-view mode under a condition that the number of the observer is 2 and an absolute value of a difference between the observation angles of the two observers is greater than a predefined threshold, and determining the two observers as equivalent observers; determining the observation mode as the single-view mode under a condition that the number of the observer is 2 and an absolute value of a difference between the observation angles of the two observers is less than the predefined threshold, and determining any one of the two observers as an equivalent observer; determining the observation mode as the single-view mode under a condition that the number of the observer is more than 2 and a difference between the observation angles of any two observers is less than the predefined threshold, and determining any one of the observers as an equivalent observer; otherwise, dividing the observers into two groups according to the observation angles, and determining the observation mode as the dual-view mode.

In some embodiments, after the determining the observation mode as the dual-view mode under a condition that the number of the observer is more than 2, the method further comprises: determining an equivalent observation position, including: determining an equivalent observer of each group in the two groups, including: determining an observer located in a middle position in the each group as the equivalent observer; or determining an observer closest to the display device in the each group as the equivalent observer.

In some embodiments, before the determining a control voltage of the liquid crystal grating according to the information of the observer and the observation mode and after the determining an observation mode according to the information of the observer, the method further comprises: determining the observation position of the equivalent observer as the equivalent observation position.

In some embodiments, the determining a control voltage of the liquid crystal grating according to the information of the observer and the observation mode includes: determining the control voltage of the liquid crystal grating according to a position and the equivalent observation position of the equivalent observer and the observation mode.

In some embodiments, a display mode corresponding to the single-view mode is to perform a first display and a second display according to the observation position of the equivalent observer, the first display and the second display are combined into a planar display content; and the dual-view mode is to perform the first display and the second display according to the observation position of the equivalent observer, the first display and the second display respectively display independent display contents.

In some embodiments, the determining a control voltage of the liquid crystal grating according to the number and the observation position of the observer, as well as the observation mode, includes: determining a target light exiting direction of each position of the liquid crystal grating according to the equivalent observation position of the observer and the observation mode; calculating a target refractive index of the each position of the liquid crystal grating according to the target light exiting direction, to obtain a corresponding refractive index mode; obtaining a deflection voltage matrix of the liquid crystal grating according to the corresponding refractive index mode; and determining the control voltage of the liquid crystal grating according to the deflection voltage matrix to control the liquid crystal to deflect.

In some embodiments, the determining a target light exiting direction of each position of the liquid crystal grating according to the observation position of the equivalent observer and the observation mode includes: in the single-view mode, a target light exiting direction of the each position of the liquid crystal grating being a direction of a connection line from a display unit at the position to the observation position of the equivalent observer; in the dual-view mode, a target light exiting direction of the each position of the liquid crystal grating being as follows: with respect to a position of the liquid crystal grating that corresponds to a display unit used for the first display, a target light exiting direction is a direction of a connection line from the display unit at the position to an observation position of a first equivalent observer; with respect to a position of the liquid crystal grating that corresponds to a display unit used for the second display, a target light exiting direction is a direction of a connection line from the display unit at the position to an observation position of a second equivalent observer.

In some embodiments, the calculating a target refractive index of each position of the liquid crystal grating according to the target light exiting direction includes: equivalently treating the liquid crystal grating as a plurality of parallel liquid crystal prisms; with respect a position corresponding to each liquid crystal prism, supposing that $N_1$ and $N_2$ are respectively equivalent refractive indices corresponding to edge positions on both sides of a display unit corresponding to the liquid crystal prism; setting an equivalent refractive index $N_1$ according to a property of a liquid crystal used in the liquid crystal grating, and solving equations below to obtain an equivalent refractive index $N_2$ as the target refractive index:

$$N_2 h = N_0 t + N_1 h;$$

$$\frac{N_1 + N_2}{2} \sin(c) = N_0 \sin(b);$$

$$\tan(a) = \frac{t}{L};$$

$$\angle b = \angle A + \angle c - 90°;$$

where, $N_0$ is an air refractive index, h is a height of the display unit, L is a length of the display unit in a horizontal direction, t is a distance from an edge on a side of the display unit that corresponds to the refractive index $N_1$ to an equivalent light exiting surface of the liquid crystal prism, $\angle A$ is an included angle between an ideal light exiting direction of the liquid crystal prism and a light exiting surface of the display unit, $\angle b$ is an included angle between the ideal light exiting direction and a normal direction of the equivalent light exiting surface of the liquid crystal prism, and $\angle c$ is an included angle between a normal direction of the light exiting surface of the display unit and the normal direction of the equivalent light exiting surface of the liquid crystal prism.

In some embodiments, the displaying an image in the display mode according to the information of the observer includes: inputting a dual-view display content of a predefined dual-view display mode to the display module and performing displaying by using the display mode, and the predefined dual-view display mode includes a landscape-in-portrait-state mode; in the landscape mode, a sub-pixel dual-view mode is used, a sub-pixel is used as a display unit, odd-row sub-pixels correspond to a picture of the first display, and even-row sub-pixels correspond to a picture of the second display; in the portrait mode, a pixel dual-view mode is used, a pixel is used as a display unit, odd-row pixels correspond to a picture of the first display, and even-row pixels correspond to a picture of the second display.

In some embodiments, the adjusting an operation mode of the liquid crystal grating according to the information of the observer is adjusting the operation mode of the liquid crystal grating in real time according to the information of the observer, to adjust the light exiting direction and the display mode of the display device in real time.

The dual-view display method according to the embodiments of the present disclosure can automatically track the position and movement of different observers; regardless of which angle an observer is located at, the screen light can be directly emitted towards the eye direction of the observer so as to achieve the best display effect. With respect to the dual-view mode, the existing fixed angle may be improved to almost any visual angle. Meanwhile, with respect to the single-view mode, the problem of the viewing angle of the original liquid crystal display may also be improved. Moreover, since the emergent light may be directionally directed to the observer, the display effect that may be achieved by an ordinary display apparatus only under a relatively high light intensity may be achieved thereby with a relatively low light intensity, which results in higher efficiency, and is favorable for saving energy and prolonging service life of a related device.

The second aspect according to the embodiments of the present disclosure provides a dual-view display device, the dual-view display device comprises a display module, a liquid crystal grating, an information acquiring module and a controller, the liquid crystal grating includes a first electrode layer, a liquid crystal layer, and a second electrode layer sequentially arranged; the liquid crystal grating is provided on a light exiting side of the display module, and configured to cause light emitted from the display module to be deflected in a specified refractive index mode under an action of a control voltage between the first electrode layer and the second electrode layer; the information acquiring module is configured to obtain information of an observation region; and the controller is configured to control a display mode of the display module and adjust an operation mode of the liquid crystal grating according to the information obtained by the information acquiring module, thereby adjusting a light exiting direction and a display mode of the display device, and the operation mode of the liquid crystal grating is adjustable.

In some embodiments, the information of the observation region obtained by the information acquiring module includes a number and an observation position of the observer within the observation region; the controller includes: an observation mode determining sub-module, configured to determine an observation mode according to the number and the observation position of the observer; a liquid crystal grating control sub-module, configured to determine a control voltage of the liquid crystal grating according to the number and the observation position of the observer, as well as the observation mode, to adjust the operation mode of the liquid crystal grating; and a dual-view display control sub-module, configured to input a dual-view display content of a predefined dual-view display mode to the display module and control the display module to display in the display mode according to the observation mode.

In some embodiments, the observation mode determining sub-module includes: an observation mode determining unit, configured to: determine the observation mode as the single-view mode or the dual-view mode, and determine an equivalent observer and an equivalent observation position; and an observation angle determining unit, configured to determine an observation angle of the observer.

In some embodiments, the determining a control voltage of the liquid crystal grating according to the number and the observation position of the observer, as well as the observation mode, includes: determining the control voltage of the liquid crystal grating according to a position and an equivalent observation position of the equivalent observer, and the observation mode.

In some embodiments, the liquid crystal grating control sub-module includes: a light exiting direction calculating unit, configured to determine a target light exiting direction of each position of the liquid crystal grating according to the observation position of the equivalent observer and the observation mode; a refractive index mode obtaining unit, configured to calculate a target refractive index of each position of the liquid crystal grating according to the target light exiting direction, to obtain the refractive index mode; a deflection voltage matrix obtaining unit, configured to obtain the deflection voltage matrix of the liquid crystal grating according to the refractive index mode; and a liquid crystal grating deflection controller, configured to control the liquid crystal grating to deflect according to the deflection voltage matrix.

In some embodiments, the light exiting direction calculating unit determines a target light exiting direction of each position of the liquid crystal grating according to the observation position of the equivalent observer and the observation mode, which includes: in the single-view mode, a target light exiting direction of each position of the liquid crystal grating being a direction of a connection line from a display unit at the position to the observation position of the equivalent observer; in the dual-view mode, a target light exiting direction of each position of the liquid crystal grating being as follows: with respect to a position of the liquid crystal grating that corresponds to a display unit used for the first display, a target light exiting direction is a direction of a connection line from the display unit at the position to an observation position of a first equivalent observer; with respect to a position of the liquid crystal grating that corresponds to a display unit used for the second display, a target light exiting direction is a direction of a connection line from the display unit at the position to an observation position of a second equivalent observer.

In some embodiments, the refractive index mode obtaining unit calculates a target refractive index of each position of the liquid crystal grating according to a target light exiting direction, which includes: equivalently treating the liquid crystal grating as a plurality of parallel liquid crystal prisms; with respect to each liquid crystal prism, supposing that $N_1$ and $N_2$ are respectively equivalent refractive indices corresponding to edge positions on both sides of a display unit corresponding to the liquid crystal prism; setting an equivalent refractive index $N_1$ according to a property of a liquid crystal used in the liquid crystal grating, and solving equations below to obtain a corresponding equivalent refractive index $N_2$ as the target refractive index:

$$N_2 h = N_0 t + N_1 h;$$
$$\frac{N_1 + N_2}{2} \sin(c) = N_0 \sin(b);$$
$$\tan(a) = \frac{t}{L};$$
$$\angle b = \angle A + \angle c - 90°;$$

where, $N_0$ is an air refractive index, h is a height of the display unit, L is a length of the display unit in a horizontal direction, t is a distance from an edge on a side of the display unit that corresponds to the refractive index $N_1$ to an equivalent light exiting surface of the liquid crystal prism, $\angle A$ is an included angle between an ideal light exiting direction of the liquid crystal prism and a light exiting surface of the display unit, $\angle b$ is an included angle between the ideal light exiting direction and a normal direction of the equivalent light exiting surface of the liquid crystal prism, and $\angle c$ is an included angle between a normal direction of the light exiting surface of the display unit and the normal direction of the equivalent light exiting surface of the liquid crystal prism.

The second aspect according to the embodiments of the present disclosure provides a non-transitory computer readable storage medium storing a computer program, and under a condition that the computer program is executed by a processor, the dual-view display method according to the first aspect of the present disclosure is implemented.

With respect to the display apparatus comprising the dual-view display device according to the second aspect of embodiments of the present disclosure, and the storage medium implementing the dual-view display method according to the first aspect of embodiments of the present disclosure as described above, specific embodiments of the related portions thereof may be obtained from the embodiments of the dual-view display method or device according to the embodiments of the present disclosure, and have advantageous effects similar to those of the dual-view display method or device according to the embodiments of the present disclosure, and no details will be repeated here.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
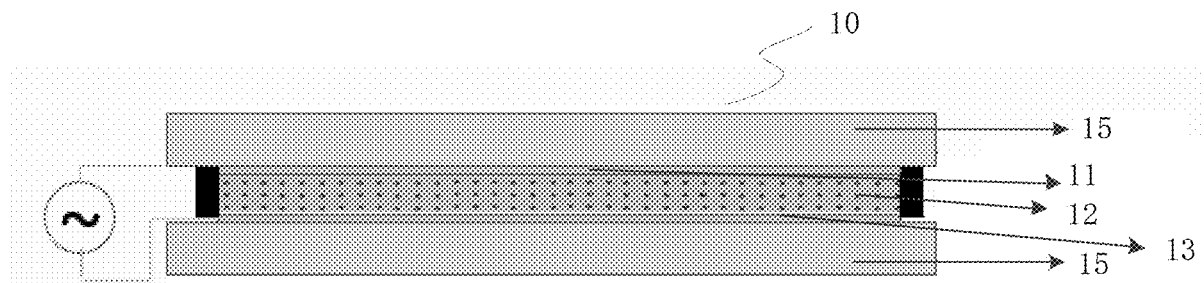
FIG. 1 is a structural schematic diagram of a liquid crystal module of a display portion of a liquid crystal display device.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In the description of the specification, the description with reference to the terms "one embodiment", "some embodiments", "examples", "specific examples", or "some examples" means that a specific feature, a structure, a material or a characteristic described in conjunction with the embodiments or examples is included in at least one embodiment or example of the embodiments of the present disclosure. In the specification, the schematic description of the above terms does not necessarily refer to the same embodiment or example. Moreover, the specific features, structures, materials, or characteristics described may be combined in any suitable manner in any one or more embodiments or examples. In addition, without contradicting each other, those skilled in the art may combine different embodiments or examples and features of the different embodiments or examples described in the specification.

In addition, the terms "first" and "second" are used for the description purpose only, and cannot be understood as indicating or implying relative importance or implicitly indicating the number of technical features indicated. Thus, the features defined with "first" and "second" may include at least one of the features either explicitly or implicitly. In the description of the embodiments of the present disclosure, the meaning of "plurality" is two or more, unless otherwise specifically limited.

The embodiments of the present disclosure are described in detail below, and examples of the embodiments are shown in the drawings, in which the same or similar reference numerals indicate the same or similar elements or elements or the elements having the same or similar functions throughout. The embodiments described below with reference to the drawings are exemplary, and are intended to explain the embodiments of the present disclosure, and should not be explained to limit the embodiments of the present disclosure.

A liquid crystal grating used for dual-view display is usually a liquid crystal diffraction grating, which uses a fixed control mode in which liquid crystal presents a specific optical effect under a specific electric field, that is, the liquid crystal operates in a certain operation state, or switches between a few states. By applying a specific control voltage to the liquid crystal, a diffraction direction of a collimated light is controlled by the liquid crystal diffraction grating to switch between two modes. In embodiments of the present disclosure, a characteristic that a liquid crystal equivalent refractive index is continuously adjustable according to the applied voltage is used in the dual-view technology.

One of the main technical ideas of the embodiments of the present disclosure is that, the characteristic that the equivalent refractive index of the liquid crystal is continuously adjustable is used to construct a liquid crystal grating operation mode in which a light exiting direction is arbitrarily adjustable, so as to implement an arbitrarily adjustable light exiting direction of the dual-view display. In addition, in combination with real-time determination of an observer's information, a display state, that is, a display mode and a light exiting direction of a dual-view display device are adaptively adjusted according to the number and positions of observers.

Hereinafter, a method and a device according to the embodiments of the present disclosure will be described in detail with reference to the accompanying drawings.

An embodiment of the present disclosure provides a dual-view display method, and the method is used for a dual-view display device comprising a display module and a liquid crystal grating. The display module may be a display module of any existing image display device, including but not limited to a liquid crystal display device, a Light Emitting Diode (LED) display device, an Organic Light-Emitting Diode (OLED) display device, and so on. The display module displays a corresponding picture according to an input display control signal; generally speaking, emergent light of the display module is approximate to parallel light and has a direction perpendicular to a display panel.

Taking the liquid crystal display device as an example, referring to FIG. 1, FIG. 1 shows a structural schematic diagram of a liquid crystal module of a display portion of the liquid crystal display device. Wherein, the liquid crystal module 10 mainly includes a substrate 15, a first control electrode layer 11, a first liquid crystal layer 12 and a second control electrode layer 13. The first control electrode layer 11 may be set as an electrode array, and the second control electrode layer 13 is set as a planar transparent electrode, so as to control deflection of a liquid crystal at each pixel point, to cooperate with parallel and vertical polarizers to implement display control.

The liquid crystal grating is provided on a light exiting side of the display module. The liquid crystal grating may include a first electrode layer, a liquid crystal layer, and a second electrode layer sequentially arranged, and is configured to cause light emitted from the display module to be deflected in a specified refractive index mode under an action of a control voltage of the first electrode layer and the second electrode layer. In the embodiments of the present disclosure, at least one of the first electrode layer and the second electrode layer may be set as a strip electrode layer, so that emergent light is refracted differently according to a region corresponding to the strip electrode. Of course, both the first electrode layer and the second electrode layer may be set as strip electrode layers, and the two are arranged correspondingly. Considering that as long as one of the electrode layers is set as a strip electrode on one side, and the other is set as a planar electrode on the other side is applied with a reference voltage, a corresponding control purpose may be achieved with simpler fabrication, in some embodiments, one of the first electrode layer and the second electrode layer is set as a strip electrode layer, and the other is set as a planar electrode layer.

Figure 2A:
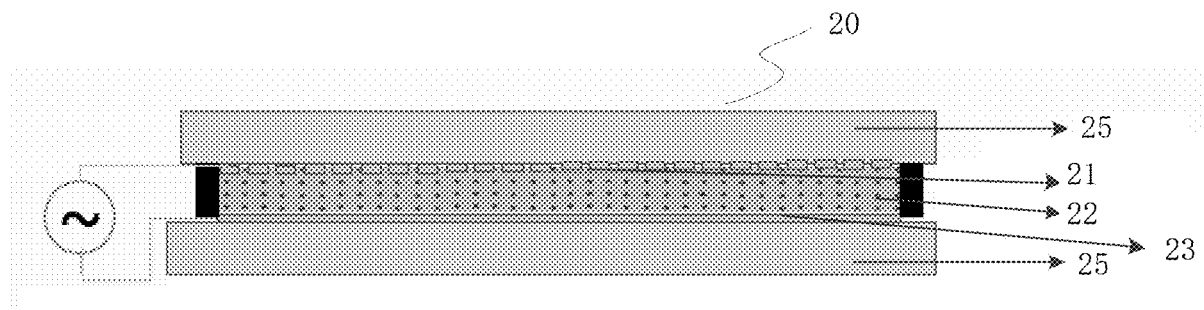
FIG. 2A is a structural schematic diagram of a liquid crystal grating according to an embodiment of the present disclosure.
Figure 2B:
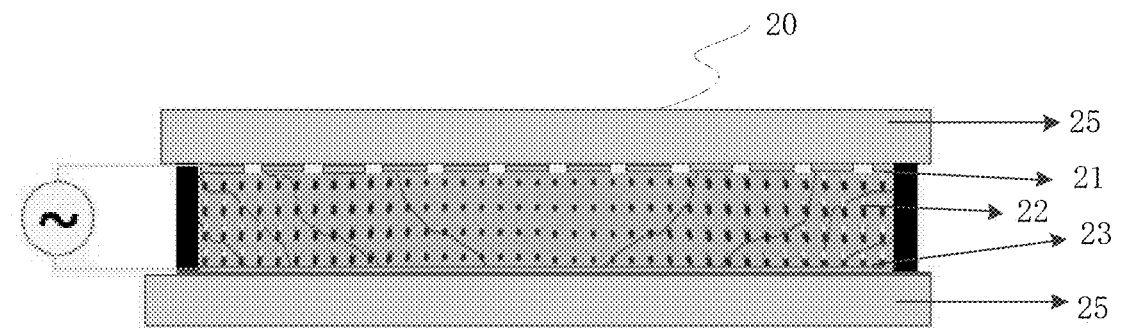
FIG. 2B is a schematic diagram of a change in an equivalent refractive index of the liquid crystal grating under an action of a deflection voltage according to the embodiment of the present disclosure.

FIG. 2A shows a structural schematic diagram of a liquid crystal grating according to an embodiment of the present disclosure. Wherein, the liquid crystal grating 20 includes a strip transparent electrode layer 21, a liquid crystal layer 22 and a planar transparent electrode layer 23 sequentially arranged. In some embodiments, a liquid crystal grating module and a display module may be integrally provided and fabricated, and at this time, an electrode layer of the liquid crystal grating may be provided on a substrate of the display module and share the substrate with the display module. In other embodiments, a liquid crystal module may also be separately provided and fabricated, and at this time, a liquid crystal grating may further include a substrate 25 provided outside. The liquid crystal grating is provided on a light exiting side of the display module, that is, a side facing a display direction, and is configured to control a space propagation direction of approximately parallel light emitted from the display module within the grating. By controlling an electrode voltage of the strip transparent electrode layer 21 (e.g., control voltages of respective strip electrodes may constitute a control voltage matrix, and deflection of liquid crystal within the liquid crystal grating is controlled by different values of the control voltage matrix), emergent light at positions corresponding to different columns of strip transparent electrodes of the strip transparent electrode layer 21 in the display module may be refracted by different angles. As shown in FIG. 2B, FIG. 2B shows that liquid crystals at positions corresponding to different strip electrodes may have different equivalent refractive indices. By comparison between FIG. 1 and FIG. 2A, it may be seen that there is little difference in structure between the liquid crystal grating according to the embodiment of the present disclosure and a liquid crystal module used for ordinary image display, so a same fabrication apparatus and technological process may be used in a fabrication process to facilitate production and fabrication. Meanwhile, since a similar process may be used in fabrication, it also brings convenience to be integrated with the existing liquid crystal display panel.

Figure 3:
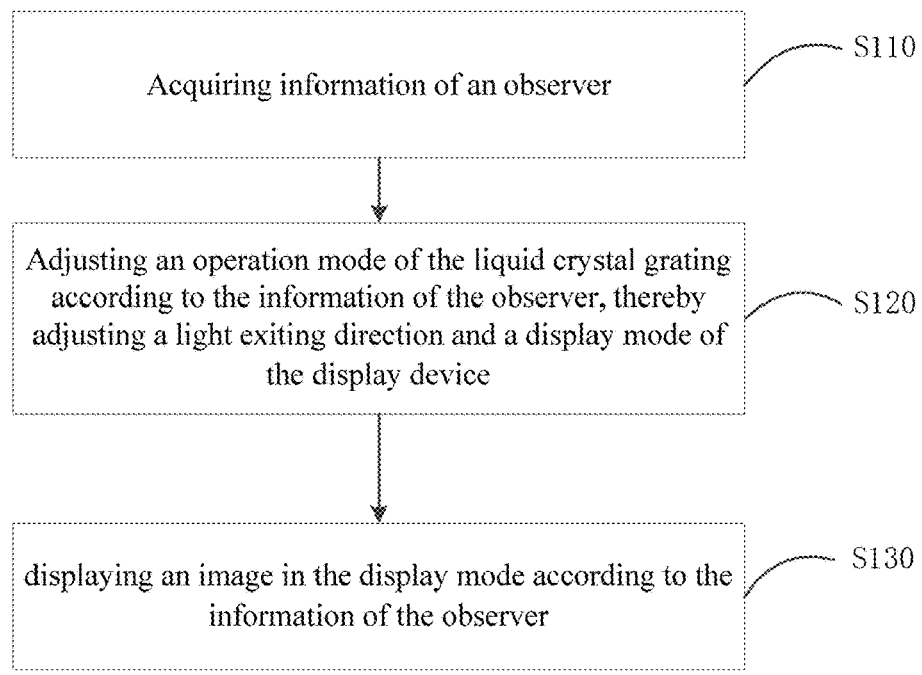
FIG. 3 is a schematic flow chart of a dual-view display method according to an embodiment of the present disclosure.

FIG. 3 is a schematic flow chart of a dual-view display method according to an embodiment of the present disclosure. The dual-view display method comprises steps S110 to S130.

Step S110: obtaining information of an observer;

Step S120: adjusting an operation mode of the liquid crystal grating according to the information of the observer, thereby adjusting a light exiting direction and a display mode of the display device; and Step S130: displaying an image in the display mode according to the information of the observer, wherein the operation mode of the liquid crystal grating is adjustable.

For example, the adjusting an operation mode of the liquid crystal grating in real time according to the information of the observer, thereby adjusting a light exiting direction and a display mode of the display device in real time, includes: determining an observation mode according to the information of the observer; determining a control voltage of the liquid crystal grating according to the information of the observer and the observation mode. The displaying an image in the display mode according to the information of the observer, includes: displaying the image in the display mode according to the observation mode.

For example, the obtaining information of the observer includes: obtaining the number and an observation position of the observer.

For example, the number and the observation position of the observer are obtained, wherein, the observer is a real observer or a virtual observer. Generally speaking, when used in actual playing, the dual-view display may be adaptively adjusted according to a specific situation of real audiences. When used in effect test or function show, virtual observers may be constructed, the dual-view display may be performed by obtaining information of the virtual observers from a control instruction. Or, when a dual-view display mode needs to be set in particular, display control may also be performed by setting virtual observers and according to the number and positions of the virtual observers. The information of the observers may include the number and the positions, etc. of the observers.

The obtaining the number and the positions of the real observers may be implemented by collecting information within a possible observation region in front of the display device using a depth camera. For example, the obtaining the number and observation positions of the real observers may include: collecting image information within the observation region of the dual-view display device in real time; identifying the number of the observers according to the image information within the observation region; identifying eye positions of the observers according to the image information within the observation region, and determining the eye positions of the observers as the observation positions thereof, wherein, the eye position refers to a symmetrical center of both eyes of an observer. By collecting and obtaining the information of the observer in real time, a light exiting direction may be adaptively adjusted according to a new position when the position of the observer is changed, so that the observer may obtain good enjoyment experience at any angle.

With respect to the identifying the observers in the image information, usually, the observers are mainly human beings. Considering that animals living with human beings are more and more involved in enjoying video contents such as TV shows, the observers may also be animals such as cats and dogs. Or, according to different needs, an identifiable object of any category may also be preset as an observer, for example, a robot, or even a camera apparatus, etc. As for a method for identifying a specific object from an image, it will not be limited in the embodiments of the present disclosure, and various modes in the related art may be applied thereto.

For example, the observation mode is determined according to the number and the observation positions of observers. The step is mainly to distinguish between a single observer and a plurality of observers, and when there are two observers and observation angles reach a certain condition, a dual-view display mode is provided to supply a different display picture to each observer. In a case of a single observer, the dual-view mode is not used, so as to provide a better display effect for the observer.

For example, the determining an observation mode according to the information of the observer includes: determining the observation mode as a single-view mode when the number of the observer is 1, the observer being an equivalent observer; determining observation angles of the observers when the number of the observer is 2 or more, and determining the observation mode as a dual-view mode or a single-view mode according to the observation angles.

For example, the determining the observation angles when the number of the observer is 2 or more includes: determining an intersection angle between a line connecting an observation position of an observer with a center of the display device and a display plane of the display device. The determining the observation mode according to the observation angles includes: determining the observation mode as the dual-view mode when the number of the observer is 2 and an absolute value of a difference between the observation angles of the two observers is greater than a predefined threshold, the two observers being equivalent observers; determining the observation mode as the single-view mode when the number of the observer is 2 and an absolute value of a difference between the observation angles of the two observers is less than the predefined threshold, and taking any one of the two observers as an equivalent observer; determining the observation mode as the single-view mode when the number of the observer is more than 2, if a difference between observation angles of any two of the observers is less than the predefined threshold, taking any one of the observers as an equivalent observer; otherwise, dividing the observers into two groups according to the observation angles, and determining the observation mode as the dual-view mode.

For example, after the determining the observation mode as the dual-view mode when the number of the observer is more than 2, the method further comprises: determining an equivalent observation position, including: determining an equivalent observer of each group in the two groups, including: determining an observer in a middle position in each group as the equivalent observer; or determining an observer closest to the display device in each group as the equivalent observer.

The display mode corresponding to the single-view mode is to perform a first display and a second display according to the observation position of the equivalent observer, the first display and the second display being combined into a planar display content. Wherein, the first display and the second display respectively refer to two display portions in dual-view display, for example, the first display corresponds to picture display of odd-column display units (pixels or sub-pixels); the second display corresponds to picture display of even-column display units (pixels or sub-pixels). In the dual-view mode, the first display and the second display are respectively used to display different pictures. In the single-view mode, since a only picture needs to be displayed in each frame, a display mode similar to normal display of a non-dual-view mode may be used, for example, the first display is used to display an odd-column content of the only picture, the second display is used to display an even-column content of the only picture, and the two jointly constitute one frame of picture. Since all the pixels are used to display a same content at this time, display resolution may be doubled for the only picture as compared with a case where two pictures are displayed at a same time in the dual-view mode.

Of course, if a user hopes to use the dual-view mode even when there is only one audience, dual-view display may be performed by setting virtual observer information.

For example, when the number of the observer is 2 and the observation angles satisfy certain conditions, the observation mode is the dual-view mode, and the display mode corresponding to the dual-view mode is to perform the first display according to an observation position of a first equivalent observer, and to perform the second display according to an observation position of a second equivalent observer, the first display and the second display independently display contents. It should be noted that, when the number of the observers is more than two, since a current display technology cannot provide triple-view or other multi-view display, only two groups of pictures can be displayed; and thus, the observers are divided into two groups according to the observation angles at which the observers are located, and one observer is selected in each group as an observer for determining the light exiting direction of dual-view display; for example, an observer whose observation angle is located in a middle position among respective observers of each group is selected as the observer, to adapt to a situation where these observers are indeed intended to watch, thereby providing better display quality for all observers; or an observer closest to the display device in each group is selected as the observer, so as to preferentially serve observers who are indeed watching display in a situation where some observers do not watch the display device though located within the observation region.

In addition, there may also be a situation where positions of two observers are very close although there are two observers corresponding to two observers. At this time, if dual-view display is performed according to the positions of the two observers, none of the two observers can normally enjoy the video content due to mutual interference of emergent light with approximate angles. In addition, when the two observers sit together, it usually means that they may want to watch a same content. Therefore, the determining the observation mode according to the number and the observation position of the observer, may further include: judging viewing angles of the two observers when the number of the observer is 2, the viewing angle is an intersection angle between a line connecting an observation position of an observer with the center of the display device and the display plane of the display device. When an absolute value of a difference between the viewing angles of the two observers is greater than the predefined threshold, the observation mode is determined as the dual-view mode, the first display and the second display independently display contents; when an absolute value of a difference between the viewing angles of the two observers is less than the predefined threshold, the observation mode is determined as the single-view mode, and the first display and the second display are combined into a planar display content.

Generally speaking, under conditions of the existing display technology, it is difficult to make a good distinction for dual-view display with a viewing angle difference smaller than about 5 degrees; and with respect to a TV watching distance of a normal family, two observers with a 5-degree viewing angle difference usually have a relatively short distance, for example, the two people sit very closely in adjacent positions on a sofa. Therefore, the predefined threshold may be set to 5 degrees. That is to say, when two observers whose viewing angle difference is within a range of ±5 degrees are detected, the observation mode is set to the single-view mode.

For example, a corresponding refractive index mode of the liquid crystal grating is determined according to the number and the observation position of the observer, as well as the observation mode. The step mainly includes determining a target light exiting direction of each position of the liquid crystal grating according to the observation position of the observer and the observation mode, and calculating a target refractive index of each position of the liquid crystal grating according to the target light exiting direction, to obtain the refractive index mode.

Figure 4:
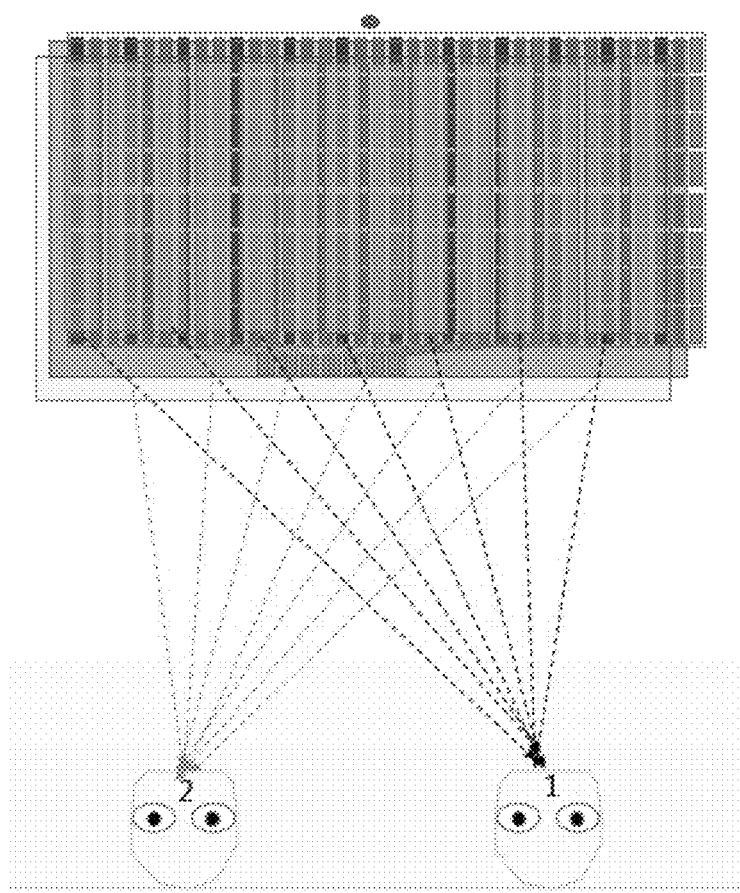
FIG. 4 is a schematic diagram of a target light exiting direction of the liquid crystal grating when two observers are in a first positional relationship according to an embodiment of the present disclosure.
Figure 5:
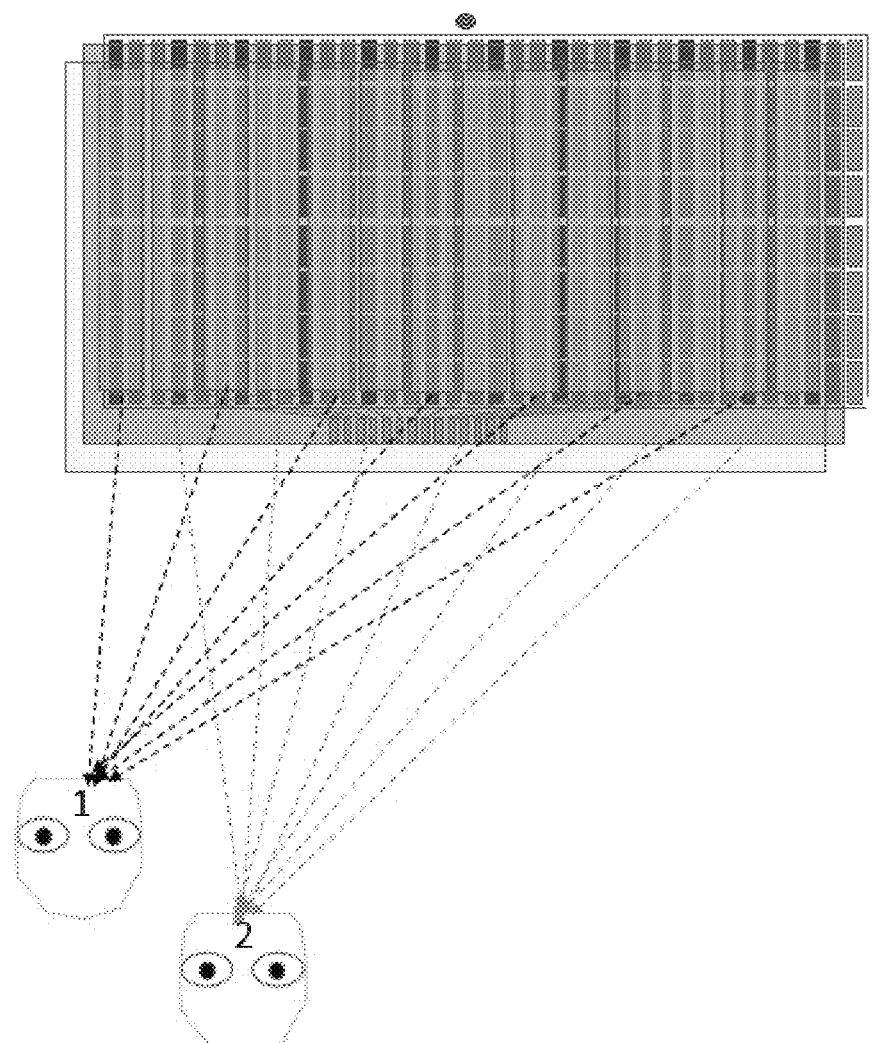
FIG. 5 is a schematic diagram of a target light exiting direction of the liquid crystal grating when two observers are in a second positional relationship according to an embodiment of the present disclosure.

Referring to FIG. 4 and FIG. 5, FIG. 4 and FIG. 5 are respectively schematic diagrams of target light exiting directions when the observers are located in different positions according to the embodiment of the present disclosure.

In the single-view mode, a target light exiting direction of each position of the liquid crystal grating is a direction along a connection line from a display unit at the position to the current observer, for example, the observation position of the equivalent observer. As compared with an ordinary display apparatus, emergent light from an ordinary display panel is not targeted, and display effects will be different when observed at different angles. In addition, in order to obtain a better display effect at all angles, a higher emergent light intensity is required, which also means more energy consumption. In the embodiment of the present disclosure, when operating in the single-view mode, emergent light of the liquid crystal grating is directionally converged to the eye position of the observer, so a good viewing effect may be obtained with a relatively small light intensity, which, thus, may save energy consumption, and prolong service life of related components.

In the dual-view mode, a target light exiting direction of each position of the liquid crystal grating is as follows: with respect to a position of the liquid crystal grating that corresponds to a display unit used for the first display, a target light exiting direction is a direction along a connection line from the display unit at the position to a first observer (observer 1), for example, an observation position of a first equivalent observer; with respect to a position of the liquid crystal grating that corresponds to a display unit used for the second display, a target light exiting direction is a direction along a connection line from the display unit at the position to a second observer (observer 2), for example, an observation position of a second equivalent observer. When the position of the observer is changed, the corresponding target light exiting direction is also changed. For example, when two observers change from the positions of FIG. 4 to the positions of FIG. 5, the target light exiting directions are also adaptively adjusted by tracking and identifying the positions of the observers in real time.

Figure 6:
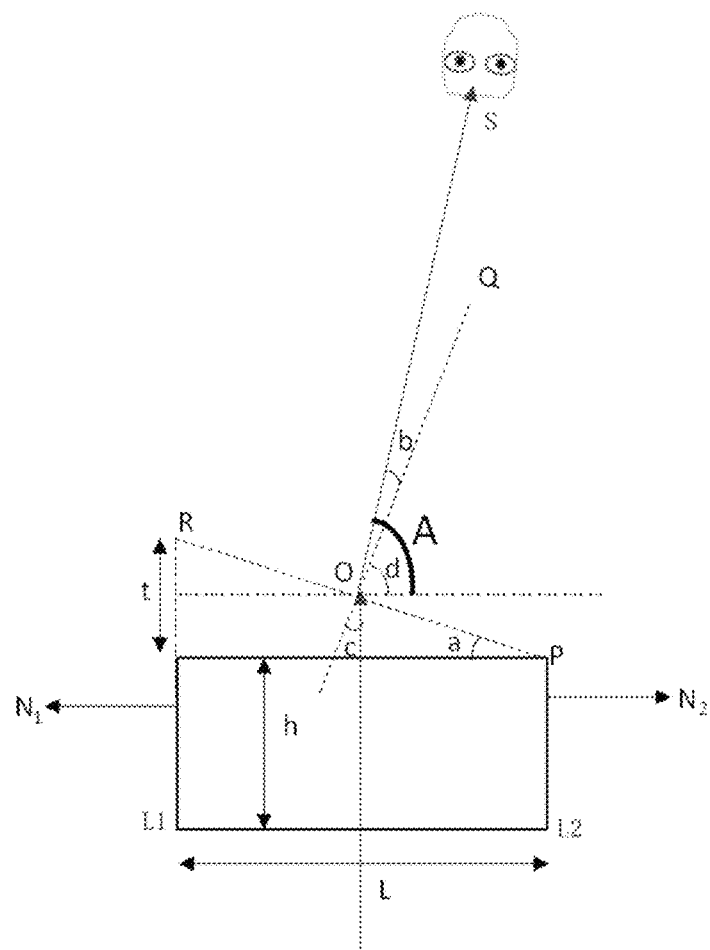
FIG. 6 is a schematic diagram of relationship between a target light exiting direction and a target refractive index of each position of the liquid crystal grating.
Figure 7:
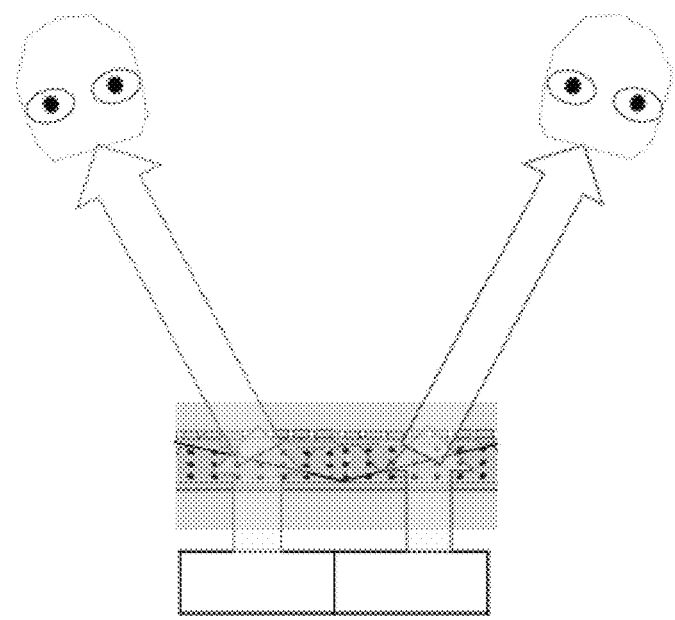
FIG. 7 is a partially enlarged schematic diagram of an optical path of the liquid crystal grating.

A target refractive index of each position of the liquid crystal grating is calculated according to a target light exiting direction; and the refractive index mode is obtained mainly by optical and geometric calculations. A corresponding liquid crystal portion below each strip electrode of the liquid crystal grating may be equivalently considered as a strip of prism approximately. Referring to FIG. 6 and FIG. 7, FIG. 6 is a schematic diagram of relationship between a target light exiting direction and a target refractive index of each position of the liquid crystal grating. FIG. 7 is an enlarged schematic diagram of a local optical path of the liquid crystal grating Combining with FIG. 6, FIG. 6 shows a cross-sectional schematic diagram of a grating region corresponding to a strip electrode in the liquid crystal grating, where L may represent a length of a dual-view display unit (which may be a pixel or a sub-pixel depending on the dual-view display mode) in a horizontal direction.

A direction (OS) of a connection line from a center position O of an equivalent light exiting surface of an n-th strip of liquid crystal prism to an observation position S is just an ideal light exiting direction of the n-th strip of liquid crystal prism. An included angle between the ideal light exiting direction (OS) and a plane where the display unit is located (i.e., the display plane) is denoted as A, and the angle A is just a target light exiting angle corresponding to the position. By introducing an auxiliary line OP through the prism center O and an edge P of the dual-view display unit, and an auxiliary line OQ perpendicular thereto, $\angle A$ may be divided into $\angle b$ and $\angle d$. Wherein, a plane determined by OP may be treated as an equivalent light exiting plane of the liquid crystal prism.

According to geometric relationship, it may be concluded that: $\angle a = \angle c$, $\angle d = 90° - \angle a$, $\angle b = \angle A - \angle d = \angle A + \angle c - 90°$. Suppose that a height of the dual-view display unit is h, R is an intersection point between PO and a vertical extension line of a left edge of the dual-view display unit. A vertical distance from point R to the dual-view display unit is t. A calculation mode for each strip of liquid crystal prism is similar, and calculations may be sequentially performed from a prism at an outmost edge of the liquid crystal grating.

Suppose that an air refractive index is $N_0$. With respect to the strip of prism, suppose that $N_1$ and $N_2$ are respectively equivalent refractive indices corresponding to edge positions on both sides of the dual-view display unit. An equivalent refractive index of the liquid crystal prism within a range of the length L in the horizontal direction may be approximately deemed to change a linearly and transitionally from $N_1$ to $N_2$.

A value of $N_1$ may be set according to characteristics of the liquid crystal used in the display device. For example, with respect to a specific liquid crystal used in the display device, a maximum equivalent refractive index and a minimum equivalent refractive index of the liquid crystal material may be determined. A relatively small refractive index value may be selected as a value of $N_1$ from a range of refractive indices of the liquid crystal material, to leave larger space for change in the equivalent refractive index of the liquid crystal prism, so that the equivalent refractive index of the liquid crystal prism has a larger controllable range. Moreover, according to a property of the liquid crystal, controllability of the change in the equivalent refractive index of the liquid crystal with an applied voltage is not very good within a range from about 10% close to the maximum value to about 10% close to the minimum value. Therefore, in some embodiments, within an interval segment in which the change in the equivalent refractive index of the liquid crystal with the control voltage is easily controlled (e.g., a 80% region in the middle), a refractive index close to the minimum value may be selected as the value of $N_1$, for example, a refractive index value in a position about 10% close to the minimum equivalent refractive index within the equivalent refractive index interval is selected as $N_1$. In this way, a purpose of subsequent calculations is to obtain a reasonable value of $N_2$.

With respect to the equivalent light exiting surface of the liquid crystal prism, that is, a plane where points R, O and P are located, optical path differences of emergent light at respective positions on the plane about incident light of the liquid crystal prism (i.e., light that enters the liquid crystal grating after being emitted from the display module) should be the same, so as to achieve a good light exiting display effect. Specifically, on the leftmost and rightmost sides of the display unit in FIG. 6, it is expected that optical path differences of an output light corresponding to the positions with refractive indices as $N_1$ and $N_2$ are the same, that is, light from a leftmost bottom position L1 of the display unit to the R point on the equivalent light exiting plane and light from a rightmost bottom position L2 of the display unit to the P point on the equivalent light exiting plane have the same propagation time; and according to a definition of refractive index, a refractive index of a medium is a ratio of a propagation velocity of light in vacuum to a propagation velocity of light in the medium, so there is:

$$\frac{h}{(c_0/N_2)} = \frac{t}{(c_0/N_0)} + \frac{h}{(c_0/N_1)},$$

where $c_0$ is the light velocity in vacuum, and after simplification, there is:

$$N_2 h = N_0 t + N_1 h \tag{1}$$

With respect to the center position of the prism, an equivalent refractive index thereof may be approximately deemed as an arithmetic mean value of the refractive indices $N_1$, $N_2$ on both sides; and therefore, at the center of the prism, according to a principle of light refraction at a substance interface, there is:

$$\frac{N_1 + N_2}{2} \sin(c) = N_0 \sin(b) \tag{2}$$

In addition, according to geometric relationship, there is:

$$\tan(a) = \frac{t}{L} \tag{3}$$

According to the above formulas (1) to (3), and the known target light exiting angle ($\angle A$), as well as the relationship $\angle b = \angle A + \angle c - 90°$ among $\angle A$, $\angle a$, $\angle b$, $\angle c$, the equations may be solved to obtain t and $N_2$.

Where, $N_0$ is the air refractive index, h is the height of the display unit, L is the length of the display unit in the horizontal direction, t is a distance from an edge on a side of the display unit that corresponds to the equivalent refractive index $N_1$ to the equivalent light exiting surface of the liquid crystal prism, $\angle A$ is the included angle between the ideal light exiting direction of the strip of liquid crystal prism and the light exiting plane of the display unit, $\angle b$ is an included angle between the ideal light exiting direction and a normal direction (OQ) of the equivalent light exiting surface of the liquid crystal prism, and $\angle c$ is an included angle between a normal direction of the light exiting plane of the display unit (i.e., the display plane) and the normal direction (OQ) of the equivalent light exiting surface of the liquid crystal prism.

With respect to each strip of prism, a calculation process is similar; and the above-described process may be repeated to obtain the refractive index mode of the entire liquid crystal grating.

For example, a deflection voltage matrix of the liquid crystal grating is obtained according to the corresponding refractive index mode, and a control voltage of the liquid crystal grating is determined according to the deflection voltage matrix, thereby controlling deflection of the liquid crystal therein. According to the equivalent refractive index values $N_1$ and $N_2$ corresponding to the positions on both sides of each strip of liquid crystal prism as obtained above, a voltage value of a strip electrode of a corresponding region of the liquid crystal grating may be determined. Control deflection voltages of respective strip electrodes of the liquid crystal grating are combined together, so as to constitute the deflection voltage matrix of the liquid crystal grating.

Since a correspondence relationship between the refractive index mode of the liquid crystal grating and the deflection voltage matrix is relatively complex, it is usually difficult to perform theoretical calculation. Therefore, in some embodiments of the embodiments of the present disclosure, a correspondence relationship table of liquid crystal refractive indices and deflection voltages is pre-stored, and then, based on the correspondence relationship table, a corresponding deflection voltage matrix is obtained according to the refractive index mode of the liquid crystal grating. Wherein, the correspondence relationship table is obtained by software simulation or experiments on liquid crystals applied with voltages. For example, with respect $N_1$ and $N_2$ already known, voltage values of strip electrodes corresponding to regions of the liquid crystal grating may be simulated by the Tecwiz software. Further, a one-to-one correspondence relationship between different target light exiting angles and voltage values of strip electrodes corresponding thereto may be established. By setting and storing the light exiting angles and the deflection voltage values in a "one-to-one" form, and directly calling when needed, a response time may be improved during adaptively real-time controlling the light exiting angle, thereby avoiding complex calculations.

For example, the displaying the image in the display mode according to the observation mode includes: inputting a dual-view display content of a predefined dual-view display mode to the display module and displaying. It should be noted that, the step of inputting a dual-view display content of a predefined dual-view display mode to the display module and displaying does not have to be executed after the above-described step S120, but may start to be executed in any stage between step S110 to step S120 or before step S110, and always maintain displaying.

For example, when operating in a state where the light exiting angle is adjusted in real time based on the positions of the observer, the dual-view content is always displayed according to a given content, while the refractive index of the liquid crystal grating is adjusted accordingly with the viewing angle of the observer, thereby constituting continuously adjusted display output.

Figure 8:
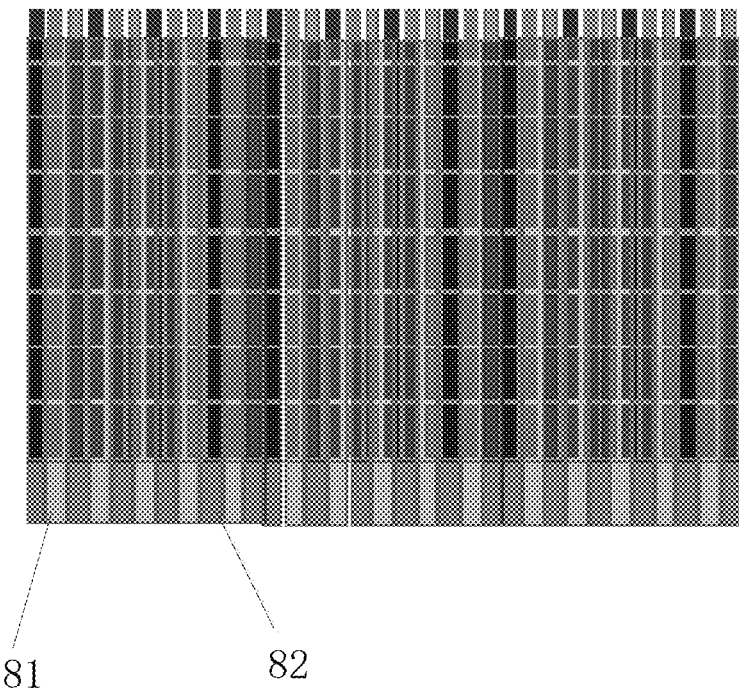
FIG. 8 is a distribution schematic diagram of display units in a sub-pixel dual-view mode.
Figure 9:
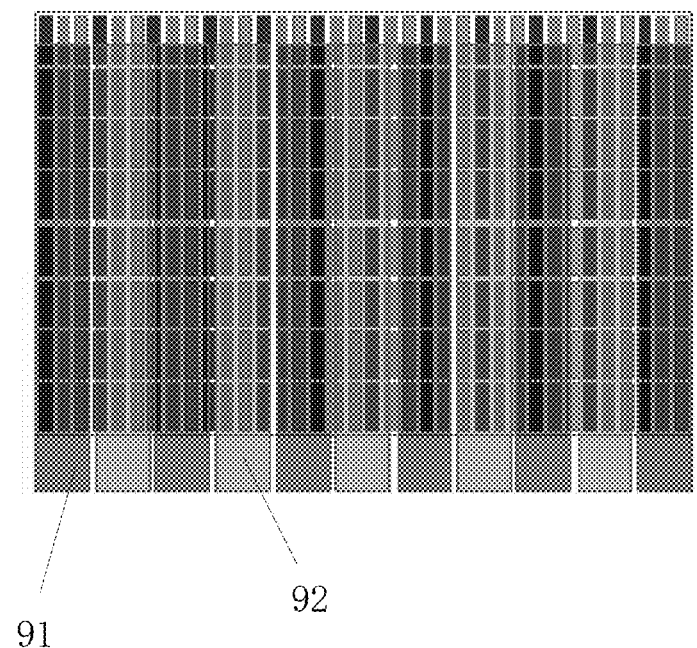
FIG. 9 is a distribution schematic diagram of display units in a pixel dual-view mode.

The dual-view display may use a sub-pixel dual-view mode or a pixel dual-view mode, or may also have various usage modes such as landscape-in-portrait-state. Referring to FIG. 8, FIG. 9 and FIG. 10, wherein, different colors respectively correspond to a first display region and a second display region of a dual-view display picture. The liquid crystal grating is provided corresponding to position distribution of the display units.

Referring to FIG. 8, FIG. 8 is a distribution schematic diagram of display units in the sub-pixel dual-view mode. Wherein, in the sub-pixel dual-view mode, a sub-pixel is taken as a display unit; odd-column sub-pixels correspond to a picture of the first display, for example, columns corresponding to dark strips 81 in FIG. 8; and even-column sub-pixels correspond to a picture of the second display, for example, columns corresponding to light strips 82.

Referring to FIG. 9, FIG. 9 is a distribution schematic diagram of display units in the pixel dual-view mode. In the pixel dual-view mode, a pixel is taken as a display unit; odd-column pixels correspond to a picture of the first display, for example, columns corresponding to dark strips 91 in FIG. 9; and even-column pixels correspond to a picture of the second display, for example, columns corresponding to light strips 92.

Figure 10A:
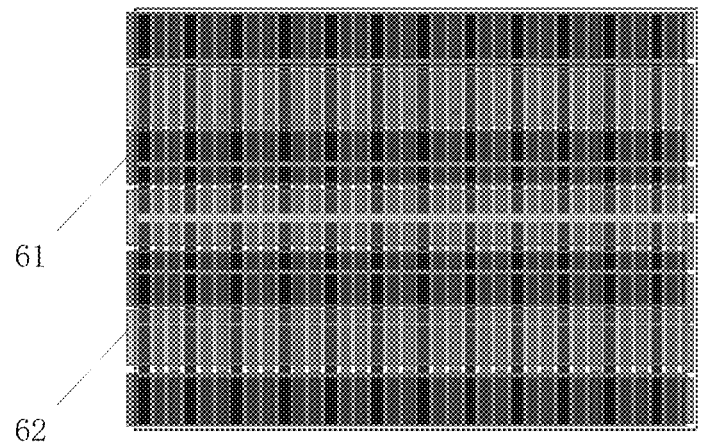
FIG. 10A and FIG. 10B are distribution schematic diagrams of display units in a landscape-in-portrait-state dual-view mode.
Figure 10B:
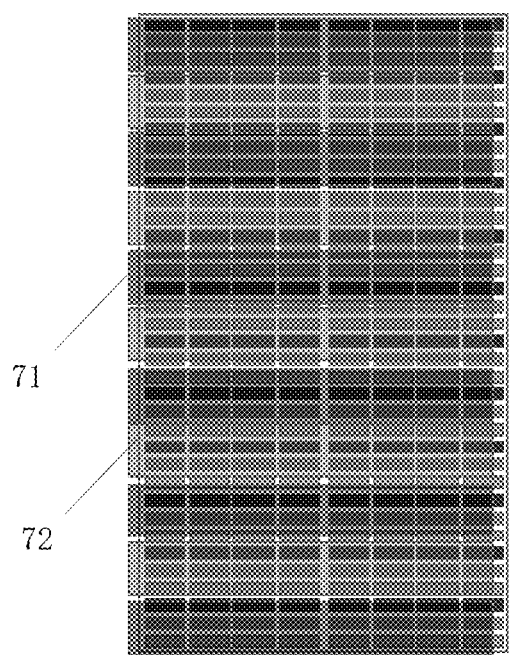

In some embodiments, in a case that the landscape is used as portrait, different dual-view modes may be used in different directions. Referring to FIG. 10A and FIG. 10B, which are distribution schematic diagrams of display units in a landscape-in-portrait-state dual-view mode.

In the landscape-in-portrait-state mode, a dual-view picture splitting direction different from that in FIG. 8 and FIG. 9 above is implemented; in FIG. 8 and FIG. 9, the first display and the second display are divided along a horizontal direction of a rectangular screen; while in FIG. 10A and FIG. 10B, the first display and the second display are divided along a vertical direction of the screen. Referring to FIG. 10A, in the landscape mode, the sub-pixel dual-view mode is used, with a sub-pixel as a display unit, odd-row sub-pixels (corresponding to rows in FIG. 10A, because FIG. 10A shows a non-rotated portrait screen for convenience in comparison with FIG. 8 and FIG. 9) correspond to a picture of the first display, for example, a region corresponding to dark strips 61; and even-row sub-pixels correspond to a picture of the second display, for example, a region corresponding to light strips 62. Referring to FIG. 10B, in the portrait mode, the pixel dual-view mode is used, with a pixel as a display unit, odd-row pixels (corresponding to rows in FIG. 10B) correspond to a picture of the first display, for example, a region corresponding to dark strips 71; and even-row pixels correspond to a picture of the second display, for example, a region corresponding to light strips 72. This mainly takes account of a fabrication process limit of the liquid crystal grating under current technical conditions; when the displaying accuracy of the screen is very high, under a limit condition that may be implemented in the landscape mode, the grating cannot reach the resolution accuracy of the sub-pixel in the portrait mode, and thus, the dual-view display mode that may be carried out in both the landscape mode and the portrait mode is provided.

In an actual operating process, the position of the observer is detected in real time; once a change in the position of the observer is identified, the target light exiting direction is recalculated, and the light exiting direction of dual-view display is changed in real time, so that emergent light at different positions of the liquid crystal grating is always converged and directed to an eye region of the observer.

The dual-view display method for adaptively adjusting the light exiting direction according to the embodiment of the present disclosure may automatically track the position and movement of different observers; regardless of which angle an observer is located at, the screen light can be directly emitted towards the eye direction of the observer so as to achieve the best display effect. With respect to the dual-view mode, the existing fixed angle may be improved to almost any visual angle. Meanwhile, with respect to the single-view mode, the problem of the viewing angle of the original liquid crystal display may also be improved. Moreover, since the emergent light may be directionally directed to the observer, the display effect that may be achieved by an ordinary display apparatus only under a relatively high light intensity may be achieved thereby with a relatively low light intensity, which results in higher efficiency, and is favorable for saving energy and prolonging service life of a related device.

Meanwhile, in order to better implement the above-described dual-view display method, an embodiment according to a second aspect of embodiments of the present disclosure further provides a dual-view display device.

Figure 11:
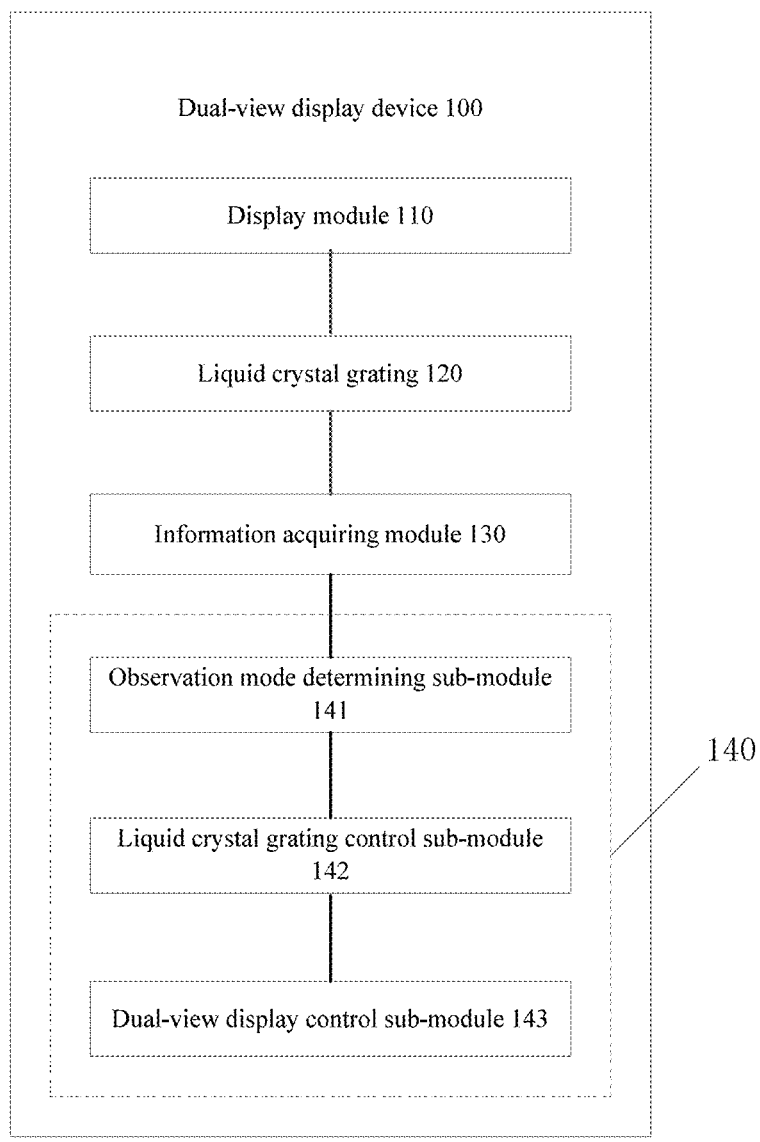
FIG. 11 is a structural block diagram of a dual-view display device according to an embodiment of the present disclosure.

Referring to FIG. 11, the dual-view display device 100 according to the embodiment of the present disclosure comprises: a display module 110, a liquid crystal grating 120, an information acquiring module 130 and a controller 140. Wherein, the description of the dual-view display method according to the embodiment of the present disclosure is also applicable to the dual-view display device according to the embodiment of the present disclosure. Specific functions and implementation of respective modules may refer to the above description of the method embodiment in conjunction with FIG. 3 to FIG. 10.

The display module 110 is configured to display according to an input display content, and may be any display module known to an inventor.

The liquid crystal grating 120 is provided on a light exiting side of the display module, that is, a side facing an observer. The liquid crystal grating may include a first strip electrode layer, a liquid crystal layer, and a second planar electrode layer sequentially arranged, and is configured to cause light emitted from the display module to be deflected in a specified refractive index mode under an action of a control voltage of the first electrode layer and the second electrode layer.

In some embodiments, at least one of the first electrode layer and the second electrode layer of the liquid crystal grating is a strip electrode layer.

The information acquiring module 130 is configured to obtain information of an observation region. Wherein, the information of the observation region may include the number of the observer and the position of the observer. The observers may be real observers or virtual observers. For example, in order to obtain the number and observation positions of the observers in real time, the information acquiring module 130 may further include an observer information collecting unit and an observer identifying unit.

The observer information collecting unit is configured to collect image information of the observation region of the dual-view display device in real time, which, for example, may be implemented by a depth camera. The observer identifying unit is configured to identify the number of the observers according to the image information of the observation region; identify an eye position of an observer according to the image information of the observation region, and determine the eye position of the observer as the observation position thereof, wherein, the eye position refers to a symmetrical center of both eyes of the observer.

For example, the controller 140 is configured to control a display mode of the display module and adjust an operation mode of the liquid crystal grating according to the information obtained by the information acquiring module, thereby adjusting a light exiting direction and a display mode of the display device.

For example, the controller 140 may further include an observation mode determining sub-module 141, a liquid crystal grating control sub-module 142, and a dual-view display control sub-module 143.

The observation mode determining sub-module 141 is configured to determine an observation mode according to the number and the observation positions of the observers. For example, as described in the dual-view display method, when the number of the observer is 1, the observation mode may be determined as a single-view mode, and a display mode corresponding to the single-view mode is to perform a first display and a second display according to an observation position of a current observer, the first display and the second display being combined into a planar display content. When the number of the observer is 2 and observation angles satisfy a certain condition, the observation mode may be determined as a dual-view mode, and a display mode corresponding to the dual-view mode is to perform the first display according to an observation position of a first observer, perform the second display according to an observation position of a second observer, the first display and the second display independently displaying contents.

In addition, in order to adapt to a situation where the observation angles of the two observers are close, the observation mode determining sub-module 141 that determines an observation mode according to the number and the observation positions of observers may further include: an observation angle determining unit, configured to further judge viewing angles of the two observers when the number of the observers is 2, the viewing angle being an intersection angle between a line connecting an observation position of an observer with a center of the display device and a plane of the display device. When an absolute value of a difference between the viewing angle of the two observers is greater than a predefined threshold, the observation mode is determined as the dual-view mode, the first display and the second display independently display contents, and the two respectively display different pictures. When an absolute value of a difference between the viewing angles of the two observers is less than the predefined threshold, the observation mode is determined as the single-view mode, and the first display and the second display are combined into a planar display content, to jointly display one picture. In some embodiments, the predefined threshold is 5 degrees.

For example, the observation mode determining sub-module 141 includes an observation mode determining unit, configured to: determine the observation mode as the single-view mode or the dual-view mode, and determine an equivalent observer and an equivalent observation position.

The liquid crystal grating control sub-module 142 is configured to determine a control voltage of the liquid crystal grating according to the number and the observation positions of the observers, as well as the observation mode. For example, a corresponding refractive index mode of the liquid crystal grating may be determined according to the number and the observation positions of the observers, as well as the observation mode; a deflection voltage matrix of the liquid crystal grating is obtained according to a corresponding refractive index mode; and the liquid crystal grating is controlled to be deflected according to the deflection voltage matrix.

Figure 12:
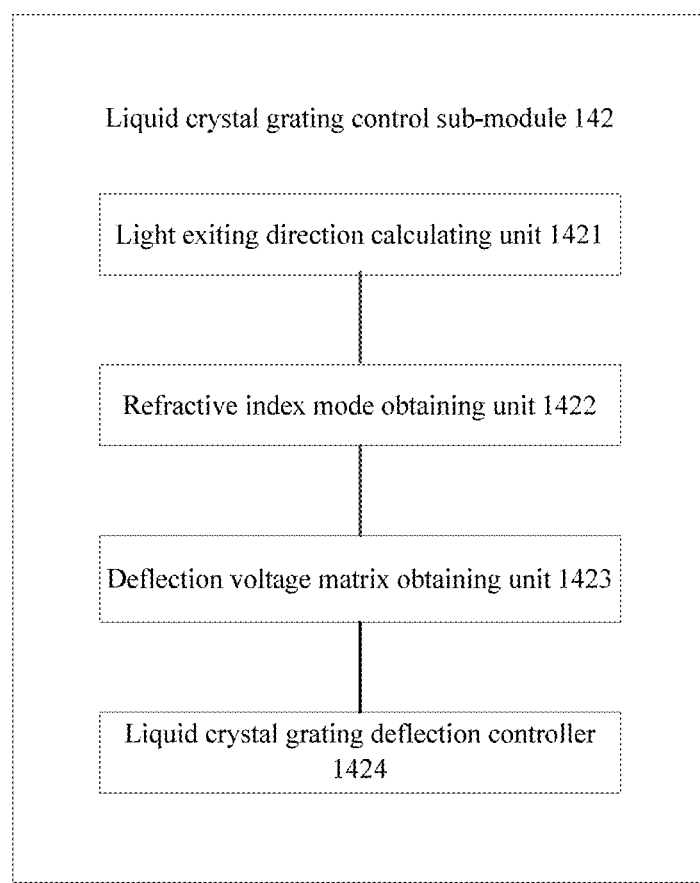
FIG. 12 is a structural block diagram of a liquid crystal grating control sub-module according to an embodiment of the present disclosure.

Referring to FIG. 12, the liquid crystal grating control sub-module 142 may further include: a light exiting direction calculating unit 1421, a refractive index mode obtaining unit 1422, a deflection voltage matrix obtaining unit 1423, and a liquid crystal grating deflection controller 1424.

The light exiting direction calculating unit 1421 is configured to determine a target light exiting direction of each position of the liquid crystal grating according to the observation position of the equivalent observer and the observation mode. Referring to description of the dual-view display method in conjunction with FIG. 3, FIG. 4 and FIG. 5, determining a target light exiting direction of each position of the liquid crystal grating according to the observation positions of the observers and the observation mode by the light exiting direction calculating unit includes: in the single-view mode, a target light exiting direction of each position of the liquid crystal grating being a direction of a connection line from a display unit at the position to the observation position of the equivalent observer; in the dual-view mode, a target light exiting direction of each position of the liquid crystal grating being as follows: with respect to a position of the liquid crystal grating that corresponds to a display unit used for the first display, a target light exiting direction is a direction of a connection line from the display unit at the position to an observation position of a first equivalent observer; with respect to a position of the liquid crystal grating that corresponds to a display unit used for the second display, a target light exiting direction is a direction of a connection line from the display unit at the position to an observation position of a second equivalent observer. The refractive index mode obtaining unit 1422 is configured to calculate a target refractive index of each position of the liquid crystal grating according to a target light exiting direction, to obtain the refractive index mode. Referring to description of the dual-view display method in conjunction with FIG. 3, FIG. 6 and FIG. 7, calculating a target refractive index of each position of the liquid crystal grating according to a target light exiting direction by the refractive index mode obtaining unit 1422 may include: equivalently treating the liquid crystal grating as a plurality of parallel liquid crystal prisms; with respect to each liquid crystal prism, supposing that $N_1$ and $N_2$ are respectively equivalent refractive indices corresponding to edge positions on both sides of a display unit corresponding to the liquid crystal prism; setting an equivalent refractive index $N_1$ according to a property of a liquid crystal used in the liquid crystal grating, and solving equations below to obtained a corresponding equivalent refractive index $N_2$ as the target refractive index:

$$N_2 h = N_0 t + N_1 h;$$

$$\frac{N_1 + N_2}{2} \sin(c) = N_0 \sin(b);$$

$$\tan(a) = \frac{t}{L};$$

$$\angle b = \angle A + \angle c - 90°;$$

Where, $N_0$ is an air refractive index, h is a height of the display unit, L is a length of the display unit in a horizontal direction, t is a distance from an edge on a side of the display unit that corresponds to the refractive index $N_1$ to an equivalent light exiting surface of the liquid crystal prism, ∠A is an included angle between an ideal light exiting direction of the liquid crystal prism and a light exiting plane of the display unit, ∠b is an included angle between the ideal light exiting direction and a normal direction of the equivalent light exiting surface of the liquid crystal prism, and ∠c is an included angle between a normal direction of the light exiting plane of the display unit and the normal direction of the equivalent light exiting surface of the liquid crystal prism. The deflection voltage matrix obtaining unit 1423 is configured to obtain the deflection voltage matrix of the liquid crystal grating according to the refractive index mode. Referring to description of step S140 in conjunction with FIG. 3, a correspondence relationship table of liquid crystal refractive indices and deflection voltages may be pre-stored, wherein, the correspondence relationship table is obtained by software simulation or experiments on liquid crystals applied with voltages. Based on the correspondence relationship table, the corresponding deflection voltage matrix is obtained according to the refractive index mode of the liquid crystal grating.

The liquid crystal grating deflection controller 1424 is configured to control the liquid crystal grating to deflect according to the deflection voltage matrix.

The dual-view display control sub-module 143 is configured to input a dual-view display content of a predefined dual-view display mode to the display module and control the display module to display. The dual-view display may use a sub-pixel dual-view mode or a pixel dual-view mode, or may also have various usage modes such as landscape-in-portrait-state. Specific forms of various dual-view display modes may refer to the description in conjunction with FIG. 8 to FIG. 10 and the above-described accompanying drawings, and no details will be repeated here.

In an actual operating process, the position of the observer are detected in real time; once a change in the position of the observer is identified, the target light exiting direction is recalculated, and the light exiting direction of the dual-view display is changed in real time, so that emergent light at different positions of the liquid crystal grating is always converged and directed to an eye region of an observer.

The dual-view display device that adaptively adjusts the light exiting direction according to the embodiment of the present disclosure may automatically track the position and movement of different observers; regardless of which angle the observer is located at, the screen light may be directly emitted towards the direction of the eyes of the observer so as to achieve the best display effect. With respect to the dual-view mode, the existing fixed angle may be improved to almost any visual angle. Meanwhile, with respect to the single-view mode, the problem of the viewing angle of the original liquid crystal display may also be improved. Moreover, since the emergent light may be directionally directed to the observer, the display effect that may be achieved by an ordinary display apparatus only under a relatively high light intensity may be achieved thereby under a relatively low light intensity, which results in higher efficiency, and is favorable for saving energy and prolonging service life of a related device.

In some embodiments of the present disclosure, a non-transitory computer readable storage medium is further proposed, stores a computer program, wherein, the program, when executed by a processor, implements the dual-view display method according to the embodiment in the first aspect of the present disclosure. The non-transitory computer-readable medium may comprise any computer-readable medium except for a temporarily transmitted signal itself.

In addition, an embodiment of the present disclosure further provides a display apparatus, comprising the dual-view display device according to the second aspect of embodiments of the present disclosure.

With respect to the display apparatus comprising the dual-view display device according to the second aspect of embodiments of the present disclosure, and the storage medium implementing the dual-view display method according to the first aspect of embodiments of the present disclosure as described above, specific embodiments of the related portions thereof may be obtained from the embodiments of the dual-view display method or device according to the embodiments of the present disclosure, and have advantageous effects similar to those of the dual-view display method or device according to the embodiments of the present disclosure, and no details will be repeated here.

It should be noted that, in the description of the specification, any process or method description in the flowchart or in other mode described herein can be understood as indicating that it includes one or more modules, fragments, or portions of the executable instruction code for implementing steps of a specific logical function or process, and the scope of the preferred implementation of the embodiments of the present disclosure includes additional implementations, in which the function may be executed in the substantial same mode or in the reverse order according to the related function and not according to the order shown or discussed, which should be understood by those skilled in the art to which the embodiments of the present disclosure belong.

The logic and/or steps represented in the flowchart or in other modes described herein, for example, may be regarded as a sequenced list of executable instructions for implementing logical functions, and may be specifically implemented in any computer-readable medium, to be used by an instruction execution system, a device or an equipment (such as computer-based systems, systems including a processor, or other systems that can read and execute instructions from instruction execution systems, devices, or equipments) or to be used by combining with such instruction execution system, a device or an equipment. For the purposes of this specification, a "computer-readable medium" may be any device that may contain, store, communicate, propagate, or transmit a program for using by or in connection with an instruction execution system, a device, or an apparatus. More specific examples of the computer-readable medium (non-exhaustive list) include the following: electrical connection parts (electronic devices) with one or more wires, portable computer disk boxes (magnetic devices), random access memory (RAM), read only memory (ROM), erasable and programmable read only memory (EPROM or flash memory), fiber optic devices, and portable optical disk only read memory (CDROM). In addition, the computer-readable medium may even be paper or other suitable medium on which the program can be printed, because, for example, by optically scanning the paper or other medium, followed by editing, interpretation, or other appropriate manner if necessary, the program can be obtained in a electronical manner and then be stored in a computer memory. It should be understood that various parts of the embodiments of the present disclosure may be implemented in hardware, software, firmware, or a combination thereof. In the above embodiments, multiple steps or methods may be implemented with software or firmware stored in memory and executed by a suitable instruction execution system. For example, if it is implemented by hardware, as in another embodiment, it can be implemented by any one or a combination of the following technologies known in the art:

discrete logic circuits with logic gates for implementing logic functions on data signals, dedicated integrated circuits with appropriate combinational logic gates, programmable gate arrays (PGA), field programmable gate arrays (FPGA), etc.

Those skilled in the art can understand that all or part of the steps carried by the method of the above embodiment can be completed by instructing relevant hardware through a program, and the program may be stored in a computer-readable storage medium. When executed, it includes one of the steps of the method embodiment or a combination thereof.

Although the embodiments of the present disclosure have been shown and described above, it can be understood that the above-mentioned embodiments are exemplary and cannot be construed as limitations to the embodiments of the present disclosure. The above embodiments can be changed, modified, replaced, and changed within the scope of the embodiments.

The application claims priority to the Chinese patent application No. 201810379700.4, filed Apr. 25, 2018, the disclosure of which is incorporated herein by reference as part of the application.

The invention claimed is:

1. A dual-view display method, used for a dual-view display device comprising a display module and a liquid crystal grating, the method comprising:
   obtaining information of an observer;
   adjusting an operation mode of the liquid crystal grating according to the information of the observer, to adjust a light exiting direction and a display mode of the display device; and
   displaying an image in the display mode according to the information of the observer, wherein the operation mode of the liquid crystal grating is adjustable,
   wherein the obtaining the information of the observer includes: obtaining a number and an observation position of the observer,
   wherein the adjusting the operation mode of the liquid crystal grating according to the information of the observer, to adjust the light exiting direction and the display mode of the display device, includes:
      determining an observation mode according to the information of the observer, wherein the determining the observation mode according to the information of the observer includes:
         determining the observation mode as a single-view mode and determining the observer as an equivalent observer under a condition that the number of the observer is 1; and
         determining observation angles of observers under a condition that the number of the observer is 2 or more, and determining the observation mode as a dual-view mode or the single-view mode according to the observation angles.

2. The dual-view display method according to claim 1, wherein the adjusting the operation mode of the liquid crystal grating according to the information of the observer, to adjust the light exiting direction and the display mode of the display device, further includes:
   determining a control voltage of the liquid crystal grating according to the information of the observer and the observation mode,
   wherein the displaying the image in the display mode according to the information of the observer, includes:
   displaying the image in the display mode according to the observation mode.

3. The dual-view display method according to claim 2, wherein before the determining the control voltage of the liquid crystal grating according to the information of the observer and the observation mode and after the determining the observation mode according to the information of the observer, the method further comprises:
   determining an observation position of the equivalent observer as an equivalent observation position.

4. The dual-view display method according to claim 3, wherein the determining the control voltage of the liquid crystal grating according to the information of the observer and the observation mode includes:
   determining the control voltage of the liquid crystal grating according to a position and the equivalent observation position of the equivalent observer and the observation mode.

5. The dual-view display method according to claim 4, wherein the determining the control voltage of the liquid crystal grating according to the position and the equivalent observation position of the equivalent observer, as well as the observation mode, includes:
   determining a target light exiting direction of each position of the liquid crystal grating according to the equivalent observation position of the observer and the observation mode;
   calculating a target refractive index of the each position of the liquid crystal grating according to the target light exiting direction, to obtain a corresponding refractive index mode;
   obtaining a deflection voltage matrix of the liquid crystal grating according to the corresponding refractive index mode; and
   determining the control voltage of the liquid crystal grating according to the deflection voltage matrix.

6. The dual-view display method according to claim 5, wherein the determining the target light exiting direction of the each position of the liquid crystal grating according to the equivalent observation position of the observer and the observation mode includes:
   in the single-view mode, a target light exiting direction of the each position of the liquid crystal grating being a direction of a connection line from a display unit at the position to the observation position of the equivalent observer;
   in the dual-view mode, a target light exiting direction of the each position of the liquid crystal grating being as follows:
      with respect to a position of the liquid crystal grating that corresponds to a display unit used for a first display, a target light exiting direction is a direction of a connection line from the display unit at the position to an equivalent observation position of a first equivalent observer; and
      with respect to a position of the liquid crystal grating that corresponds to a display unit used for a second display, a target light exiting direction is a direction of a connection line from the display unit at the position to an equivalent observation position of a second equivalent observer.

7. The dual-view display method according to claim 5, wherein the calculating the target refractive index of the each position of the liquid crystal grating according to the target light exiting direction includes: equivalently treating the liquid crystal grating as a plurality of parallel liquid crystal prisms; with respect to a position corresponding to each liquid crystal prism, supposing that $N_1$ and $N_2$ are respectively equivalent refractive indices corresponding to edge positions on both sides of a display unit corresponding to the liquid crystal prism; setting an equivalent refractive index $N_1$ according to a property of a liquid crystal used in the liquid crystal grating, and solving equations below to obtain an equivalent refractive index $N_2$ as the target refractive index:

$$N_2 h = N_0 t + N_1 h;$$
$$\frac{N_1 + N_2}{2} \sin(c) = N_0 \sin(b);$$
$$\tan(a) = \frac{t}{L};$$
$$\angle b = \angle A + \angle c - 90°;$$

where, $N_0$ is an air refractive index, h is a height of the display unit, L is a length of the display unit in a horizontal direction, t is a distance from an edge on a side of the display unit that corresponds to the refractive index $N_1$ to an equivalent light exiting surface of the liquid crystal prism, ∠A is an included angle between an ideal light exiting direction of the liquid crystal prism and a light exiting surface of the display unit, ∠b is an included angle between the ideal light exiting direction and a normal direction of the equivalent light exiting surface of the liquid crystal prism, and ∠c is an included angle between a normal direction of the light exiting surface of the display unit and the normal direction of the equivalent light exiting surface of the liquid crystal prism.

8. The dual-view display method according to claim 1, wherein the obtaining the number and the observation position of the observer includes:
collecting image information within an observation region of the dual-view display device in real time;
identifying the number of the observer according to the image information within the observation region; and
identifying an eye position of the observer according to the image information within the observation region, and determining the eye position of the observer as the observation position of the observer,
wherein the eye position is a symmetrical center of both eyes of the observer.

9. The dual-view display method according to claim 1, wherein the determining the observation angles of the observers under the condition that the number of the observer is 2 or more includes:
determining an intersection angle between a line connecting the observation position of the observer with a center of the display device and a display plane of the display device,
wherein the determining the observation mode according to the observation angles includes:
determining the observation mode as the dual-view mode under a condition that the number of the observer is 2 and an absolute value of a difference between the observation angles of the two observers is greater than a predefined threshold, and determining the two observers as equivalent observers; determining the observation mode as the single-view mode under the condition that the number of the observer is 2 and an absolute value of the difference between the observation angles of the two observers is less than the predefined threshold, and determining any one of the two observers as an equivalent observer;
determining the observation mode as the single-view mode under a condition that the number of the observer is more than 2 and a difference between the observation angles of any two observers is less than the predefined threshold, and determining any one of the observers as an equivalent observer; otherwise, dividing the observers into two groups according to the observation angles, and determining the observation mode as the dual-view mode.

10. The dual-view display method according to claim 9, wherein after the determining the observation mode as the dual-view mode under the condition that the number of the observer is more than 2, the method further comprises:
determining an equivalent observation position, including:
determining an equivalent observer of each group in the two groups, including:
determining an observer located in a middle position in the each group as the equivalent observer; or
determining an observer closest to the display device in the each group as the equivalent observer.

11. The dual-view display method according to claim 1, wherein a display mode corresponding to the single-view mode is to perform a first display and a second display according to the observation position of the equivalent observer, the first display and the second display are combined into a planar display content; and the dual-view mode is to perform the first display and the second display according to the observation position of the equivalent observer, the first display and the second display respectively display independent display contents.

12. The dual-view display method according to claim 1, wherein the displaying the image in the display mode according to the information of the observer, includes:
inputting a dual-view display content of a predefined dual-view display mode to the display module and performing displaying by using the display mode,
wherein the predefined dual-view display mode includes a landscape-in-portrait-state mode; in the landscape mode, a sub-pixel dual-view mode is used, a sub-pixel is used as a display unit, odd-row sub-pixels correspond to a picture of a first display, and even-row sub-pixels correspond to a picture of a second display; and
in the portrait mode, a pixel dual-view mode is used, a pixel is used as a display unit, odd-row pixels correspond to a picture of the first display, and even-row pixels correspond to a picture of the second display.

13. The dual-view display method according to claim 1, wherein the adjusting the operation mode of the liquid crystal grating according to the information of the observer is adjusting the operation mode of the liquid crystal grating in real time according to the information of the observer, to adjust the light exiting direction and the display mode of the display device in real time.

14. A non-transitory computer readable storage medium, storing a computer program, wherein under a condition that the computer program is executed by a processor, the dual-view display method according to claim 1 is implemented.

15. A dual-view display device, comprising a display module, and further comprising:
a liquid crystal grating, the liquid crystal grating including a first electrode layer, a liquid crystal layer, and a second electrode layer sequentially arranged; the liquid crystal grating being provided on a light exiting side of the display module, and configured to cause light emitted from the display module to be deflected in a specified refractive index mode under an action of a control voltage between the first electrode layer and the second electrode layer;

an information acquiring module, configured to obtain information of an observation region; and a controller, configured to control a display mode of the display module and adjust an operation mode of the liquid crystal grating according to the information obtained by the information acquiring module, thereby adjusting a light exiting direction and a display mode of the display device, wherein, the operation mode of the liquid crystal grating is adjustable, wherein the information of the observation region obtained by the information acquiring module includes a number and an observation position of the observer within the observation region, the controller includes:

an observation mode determining sub-module, configured to determine an observation mode according to the number and the observation position of the observer;

a liquid crystal grating control sub-module, configured to determine a control voltage of the liquid crystal grating according to the number and the observation position of the observer, as well as the observation mode, to adjust the operation mode of the liquid crystal grating; and a dual-view display control sub-module, configured to input a dual-view display content of a predefined dual-view display mode to the display module and control the display module to display in the display mode according to the observation mode, wherein the observation mode determining sub-module includes:

an observation mode determining unit, configured to: determine the observation mode as a single-view mode or a dual-view mode, and determine an equivalent observer and an equivalent observation position; and an observation angle determining unit, configured to determine an observation angle of the observer.

16. The dual-view display device according to claim 15, wherein the determining the control voltage of the liquid crystal grating according to the number and the observation position of the observer, as well as the observation mode, includes: determining the control voltage of the liquid crystal grating according to a position and an equivalent observation position of the equivalent observer, and the observation mode.

17. The dual-view display device according to claim 16, wherein the liquid crystal grating control sub-module includes:

a light exiting direction calculating unit, configured to determine a target light exiting direction of each position of the liquid crystal grating according to the observation position of the equivalent observer and the observation mode;

a refractive index mode obtaining unit, configured to calculate a target refractive index of each position of the liquid crystal grating according to the target light exiting direction, to obtain the refractive index mode;

a deflection voltage matrix obtaining unit, configured to obtain the deflection voltage matrix of the liquid crystal grating according to the refractive index mode; and a liquid crystal grating deflection controller, configured to control the liquid crystal grating to deflect according to the deflection voltage matrix.

18. A dual-view display method, used for a dual-view display device comprising a display module and a liquid crystal grating, the method comprising:

obtaining information of an observer;

adjusting an operation mode of the liquid crystal grating according to the information of the observer, to adjust a light exiting direction and a display mode of the display device; and displaying an image in the display mode according to the information of the observer, wherein the operation mode of the liquid crystal grating is adjustable, wherein the displaying an image in the display mode according to the information of the observer includes:

inputting a dual-view display content of a predefined dual-view display mode to the display module and performing displaying by using the display mode, wherein the predefined dual-view display mode includes a landscape-in-portrait-state mode; in the landscape mode, a sub-pixel dual-view mode is used, a sub-pixel is used as a display unit, odd-row sub-pixels correspond to a picture of a first display, and even-row sub-pixels correspond to a picture of a second display; and in the portrait mode, a pixel dual-view mode is used, a pixel is used as a display unit, odd-row pixels correspond to a picture of the first display, and even-row pixels correspond to a picture of the second display.

* * * * *